United States Patent
Baumgartner

(10) Patent No.: US 7,566,090 B2
(45) Date of Patent: Jul. 28, 2009

(54) CENTERING DEVICE FOR A MOTOR VEHICLE HAVING A RETRACTABLE OR DETACHABLE TOP

(75) Inventor: Gerd Baumgartner, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/277,984

(22) Filed: Nov. 25, 2008

(65) Prior Publication Data

US 2009/0072591 A1 Mar. 19, 2009

Related U.S. Application Data

(63) Continuation of application No. PCT/EP2007/004145, filed on May 10, 2007.

(30) Foreign Application Priority Data

May 26, 2006 (DE) .................. 10 2006 024 612

(51) Int. Cl.
*B60J 7/00* (2006.01)
(52) U.S. Cl. ................... 296/121; 296/132; 296/134
(58) Field of Classification Search ............... 296/121, 296/124, 126, 128, 131, 132, 133, 134
See application file for complete search history.

(56) References Cited

U.S. PATENT DOCUMENTS

| | | | | |
|---|---|---|---|---|
| 3,425,742 A | * | 2/1969 | Rauber, Jr. ................ | 296/121 |
| 4,618,180 A | * | 10/1986 | Muscat .................... | 296/120.1 |
| 5,085,483 A | * | 2/1992 | Alexander ................ | 296/121 |
| 5,186,516 A | * | 2/1993 | Alexander et al. ......... | 296/121 |
| 5,499,855 A | | 3/1996 | Andres et al. | |
| 5,636,894 A | | 6/1997 | Kinnanen | |
| 5,678,881 A | * | 10/1997 | Tokarz ..................... | 296/121 |
| 5,868,454 A | | 2/1999 | Homann et al. | |
| 6,213,534 B1 | * | 4/2001 | Mac Farland ............. | 296/121 |

(Continued)

FOREIGN PATENT DOCUMENTS

DE 43 12 323 C1 7/1994

(Continued)

OTHER PUBLICATIONS

International Search Report dated Sep. 5, 2007 with English translation (Four (4) pages).

(Continued)

*Primary Examiner*—Lori L Lyjak
(74) *Attorney, Agent, or Firm*—Crowell & Moring LLP

(57) ABSTRACT

A centering device for a motor vehicle having a convertible or folding top or hardtop, includes a protruding centering pin on a centering pin carrier and a centering bushing on a centering bushing carrier. A centering opening is provided in the centering bushing, which radially centers the centering pin upon penetration of at least one area of the centering pin into the centering opening. Either the centering bushing is situated in a guide opening of the centering bushing carrier or the centering pin is situated in a guide opening of the centering pin carrier so it is axially adjustable between stops. The adjustable centering bushing or the adjustable centering pin is loaded by an elastic spring device against a stop toward the fixed part, toward the centering pin, or toward the centering bushing.

16 Claims, 1 Drawing Sheet

U.S. PATENT DOCUMENTS

2004/0046416 A1* 3/2004 Heller et al. ................ 296/121
2006/0255620 A1* 11/2006 MacNee et al. ............ 296/121

FOREIGN PATENT DOCUMENTS

| DE | 195 33 802 C1 | 3/1997 |
| DE | 197 36 508 A1 | 4/1999 |
| DE | 102 07 457 A1 | 9/2003 |
| DE | 102 24 097 A1 | 12/2003 |
| DE | 102 51 957 A1 | 5/2004 |
| DE | 103 25 257 A1 | 1/2005 |
| EP | 0 410 683 A2 | 1/1991 |

OTHER PUBLICATIONS

German Search Report dated Mar. 5, 2007 with English translation of relevant portions (Nine (9) pages.

* cited by examiner

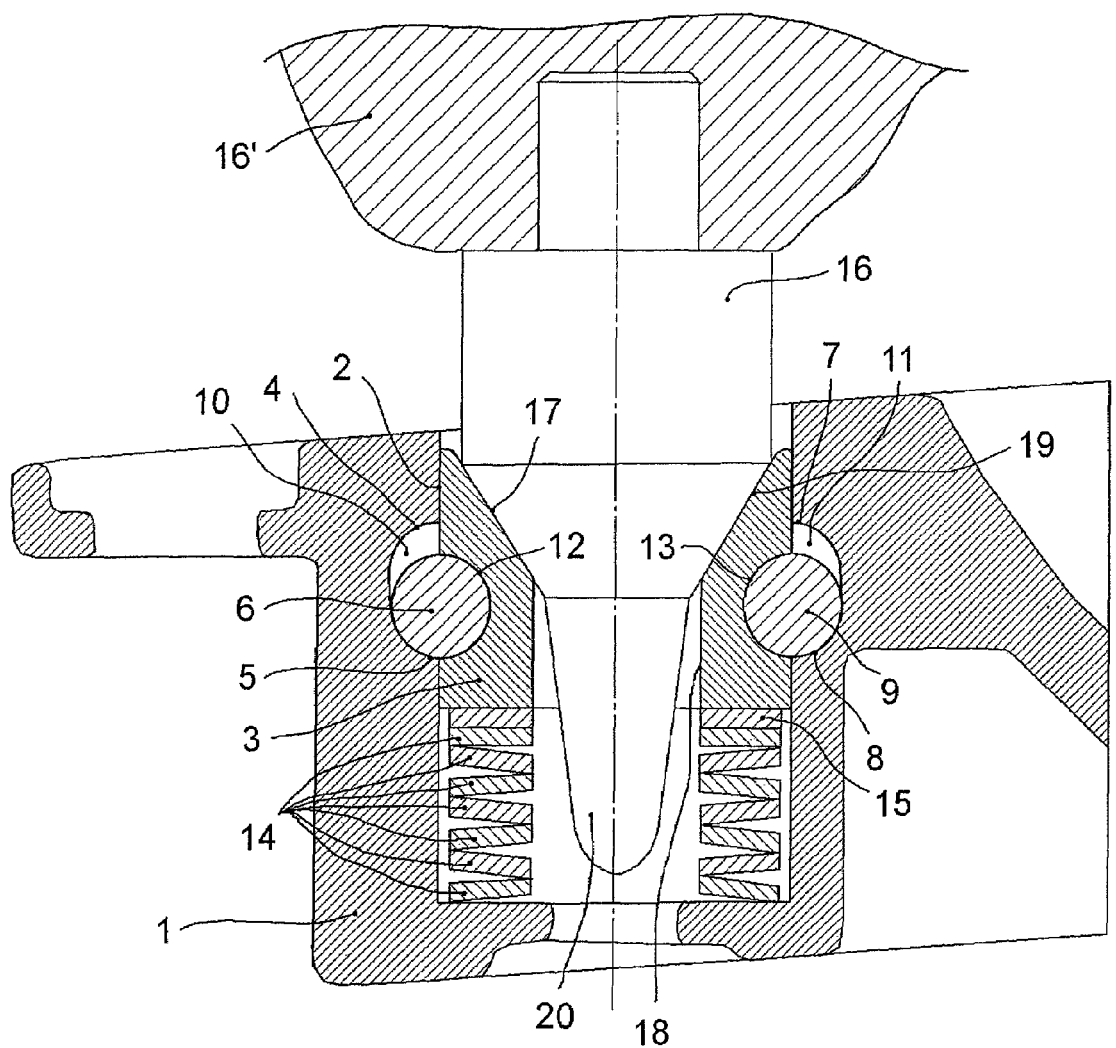

CENTERING DEVICE FOR A MOTOR VEHICLE HAVING A RETRACTABLE OR DETACHABLE TOP

CROSS-REFERENCE TO RELATED APPLICATIONS

This application is a continuation of PCT International Application No. PCT/EP2007/004145, filed May 10, 2007, which claims priority under 35 U.S.C. § 119 to German Patent Application No. DE 10 2006 024 612.8, filed May 26, 2006, the entire disclosures of which are herein expressly incorporated by reference.

BACKGROUND AND SUMMARY OF THE INVENTION

The invention relates to a centering device for a motor vehicle having a retractable or detachable top, such as a convertible or folding top or a hardtop, and, in particular, to a centering device having a protruding centering pin on a centering pin carrier, a centering bushing on a centering bushing carrier, and a centering opening in the centering bushing, which opening radially centers the centering pin upon penetration of at least one area of the centering pin into the centering opening.

A centering device of this type is described in DE 102 24 097 A1 on a motor vehicle having a convertible top in particular, between a forward area of the convertible top, for example, and an upper cowl above the front windshield. In addition, a locking device is provided, which fixes the closed convertible top on the upper cowl. Due to elasticity of the top frame in particular, the closed and locked convertible top may execute movements when driving over ground irregularities, upon which the centering pins strike hard on the centering bushing and cause annoying noises. Noises of this type may also occur if the centering pins press against the centering bushing when the convertible top is closed and lift briefly off of the centering bushing and then strike hard on the centering bushing in driving operation because of the elasticity of the convertible top in particular.

There is therefore needed a centering device which causes no, or fewer, noises during operation of the motor vehicle.

The invention provides a centering device for a motor vehicle having a protruding centering pin on a centering pin carrier, a centering bushing on a centering bushing carrier, and a centering opening in the centering bushing, which opening radially centers the centering pin upon penetration of at least one area of the centering pin into the centering opening. Either the centering bushing is situated in a guide opening of the centering bushing carrier or the centering pin is situated in a guide opening of the centering pin carrier so it is axially adjustable between stops and is loaded by an elastic spring device against a stop toward the fixed part, toward the centering pin, or toward the centering bushing.

Because the centering bushing is situated on the centering bushing carrier so it is axially adjustable between stops and is loaded against a stop toward the centering pin by an elastic spring device, the centering pin presses essentially continuously axially on the centering bushing when the convertible or folding top or hardtop is closed and, therefore, cannot strike hard and noisily on the centering bushing in the event of elastic deformations of the closed convertible or folding top. Because the centering bushing is additionally loaded by the elastic spring device against a stop toward the centering pin, elastic movements of the closed convertible or folding top or hardtop in the area of the centering device are prevented, or at least reduced, by the spring device if a locking device does not fix the closed convertible or folding top or hardtop sufficiently stably. The centering device may also compensate for larger component tolerances and prevent an overload of the locking device.

Other objects, advantages and novel features of the present invention will become apparent from the following detailed description of one or more preferred embodiments when considered in conjunction with the accompanying drawings.

BRIEF DESCRIPTION OF THE DRAWING

The single figure shows a simplified cross-section through the pertinent parts of an exemplary centering device according to the invention.

DETAILED DESCRIPTION OF THE DRAWING

In the single FIGURE, the centering device, which is provided on a vehicle having a retractable top, such as a convertible or folding top or hardtop, is shown in a position wherein the convertible or folding top or hardtop is closed. The convertible or folding top or hardtop is locked by a locking device (not shown) on an upper cowl (also not shown) above a front windshield (not shown) of the motor vehicle. The cowl has a centering bushing carrier 1 having an approximately vertical guide opening 2, in which the centering bushing 3 is adjustable in height delimited axially by stops 4, 5, 6 and/or 7, 8, 9.

The stops 4, 5, 6 and/or 7, 8, 9 delimiting the axial adjustment path of the centering bushing 3 are formed by two longitudinal recesses 10, 11 in the centering bushing carrier 1 and two stop bodies 6 and 9, respectively, a peripheral area of the stop body 6 or 9 engaging in a recess 12 or 13 in the centering bushing 3 essentially without play. Another peripheral area of the stop body 6 or 9 engages in an associated longitudinal recess 10 or 11 so it is adjustable in the axial direction of the centering bushing 3 and works together with the axial end areas 4, 5 or 7, 8 of the relevant longitudinal recess 10 or 11 in such a way that the axial adjustment path of the centering bushing 3 is delimited.

In the exemplary embodiment, the longitudinal recesses 10, 11 are each formed by an oblong hole and the stop bodies 6, 9 are each formed by a pin or rod which is circular in cross-section.

The centering bushing 3 is loaded upward by an elastic spring device, whereby the pins 6, 9 press against the upper end areas 4, 7 of the oblong holes 10, 11 when the convertible or folding top or hardtop is open and thus delimit the adjustment range of the centering bushing 3 on top. The spring device has multiple disc springs 14 and an insert disc 15, which are situated in series one behind another and are situated axially pre-tensioned between the lower front face of the centering bushing 3 and a floor surface of the guide opening 2 in the centering bushing carrier 1. The centering bushing 3 has a central axial centering opening 18, which is provided on the upper boundary area with a centering truncated cone 19.

The centering device has a projecting centering pin 16 on a centering pin carrier 16' (only indicated), which is formed by a front area of the closed convertible or folding top or hardtop. The centering pin 16 has a centering face 17 in the form of a truncated cone on its protruding area, which radially centers the centering pin 16 working together with the centering truncated cone 19 of the centering bushing 3 upon penetration of at least one area of the centering pin 16 into the centering opening 18 of the centering bushing 3. The centering bushing 3 is partially or completely pushed downward or partially or completely pushed downward and then partially or completely pushed upward against the pre-tension force of the disc springs 14 in the guide opening 2 if necessary, until the locked closed position of the convertible or folding top or hardtop is reached. The centering pin 16 penetrates axially into the centering opening 18 upon closing of the convertible or folding top, or is removed axially from the centering opening 18 when the previously unlocked convertible or folding top is opened.

When the convertible or folding top or hardtop is closed, the centering bushing 3 may be located in an approximately central position inside the adjustment range of the centering bushing 3 or at one or another end area of the adjustment range.

A centering lug 20 projecting axially downward adjoins the smaller diameter of the centering surface 17, which has the form of a truncated cone, of the centering pin 16. The centering lug 20 has a smaller diameter tapering downward in relation to the centering opening 18 and causing a radial pre-centering of the centering pin 16 working together with the centering opening 18 upon penetration of the centering pin 16 into the centering opening 18.

Notwithstanding the exemplary embodiment, the centering pin may also be situated protruding on the cowl or on a component supported and/or fastened thereon, the centering bushing then being situated so it is adjustable on a front area of the convertible or folding top or hardtop.

In a further alternative embodiment, the centering pin is situated so it is axially adjustable between stops in a guide opening of the centering pin carrier and is loaded by an elastic spring device against a stop toward the fixed centering bushing. The centering surface on the centering pin in the form of a truncated cone may also be dispensed with or be formed by another surface or edge. The centering truncated cone on the centering bushing may also be dispensed with or be formed by another surface or edge, for example, by a curved centering approach surface. The stops may also be formed in a completely different way. One stop may be formed by the elastic spring device when it has reached its block length. If a longitudinal recess is used, it may be implemented in the centering bushing or in the centering bushing carrier, the stop body then being situated on the other part, on the centering bushing carrier or on the centering bushing, respectively. The longitudinal recess may, for example, also be implemented as outwardly open in one axial direction in the relevant component, for example, in the centering bushing carrier or centering pin carrier. For example, in this case the longitudinal recess may be closed or radially constricted on the axially open front side by a separate component in such a way that the elastic spring element may be axially supported on this component. The longitudinal recess may also be formed by a ring recess on an inner circumference of an opening receiving the centering bushing or on an outer circumference of the centering bushing and the stop body may be formed by a stop ring, the longitudinal extension of the ring recess being greater than the longitudinal extension of the stop ring in the axial direction of the centering bushing in each case.

The centering device prevents or reduces noises of the centering pin in driving operation and relieves a typical locking device. In addition, the centering device allows secure locking of the locking device. Component tolerances, which may also be selected as larger, are compensated for by the centering device. The elastic spring device may have at least one arbitrary elastic element, for example, also another metallic spring element or a rubber spring or at least one element made of elastomer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A centering device for a motor vehicle having a top, the centering device comprising:
   a centering pin carrier having a protruding centering pin;
   a centering bushing carrier having a centering bushing, a centering opening being arranged in the centering bushing to radially center the centering pin upon penetration of at least one area of the centering pin into the centering opening;
   wherein either the centering bushing in a guide opening of the centering bushing carrier or the centering pin in a guide opening of the centering pin carrier is operatively configured to be axially adjustable between stops and loadable by an elastic spring device against at least one stop toward a fixed part, the centering pin, or the centering bushing.

2. The centering device according to claim 1, wherein the centering pin carrier is configured on a front area of the top and the centering bushing carrier is configured in an area of an upper cowl above a front windshield of the motor vehicle.

3. The centering device according to claim 1, wherein the centering bushing carrier is configured on a front area of the top and the centering pin carrier is configured in an area of an upper cowl above a front windshield of the motor vehicle.

4. The centering device according to claim 1, wherein the centering pin has a centering surface on a protruding area, which centering surface radially centers the centering pin working together with a boundary area of the centering opening.

5. The centering device according to claim 4, wherein the centering surface has a truncated cone form and an axially protruding centering lug adjoins a smaller diameter of the centering surface, the centering lug having a smaller diameter than the centering opening and causing a radial pre-centering of the centering pin working together with the centering opening upon penetration of the centering pin into the centering opening.

6. The centering device according to claim 1, wherein a boundary area of the centering opening facing toward the centering pin has a centering truncated cone or a curved centering intake surface, whereby the centering pin is radially centered working together with the centering truncated cone or the centering intake surface upon penetration into the centering opening.

7. The centering device according to claim 5, wherein a boundary area of the centering opening facing toward the centering pin has a centering truncated cone or a curved centering intake surface, whereby the centering pin is radially centered working together with the centering truncated cone or the centering intake surface upon penetration into the centering opening.

8. The centering device according to claim 1, wherein the stops delimiting the axial adjustment path of the centering bushing are formed by at least one longitudinal recess in the centering bushing or in the centering bushing carrier and at least one stop body, a peripheral area of the stop body engaging essentially without play in a recess in the other part, in the centering bushing carrier, or in the centering bushing, and another peripheral area of the stop body engaging in an adjustable manner in the axial direction of the centering bushing in the longitudinal recess and delimiting the axial adjustment path of the centering bushing working together with the axial end areas of the longitudinal recess.

9. The centering device according to claim 8, wherein the longitudinal recess is formed by an oblong hole and the stop body is formed by a pin or rod which is circular in cross-section.

10. The centering device according to claim 8, wherein the longitudinal recess is formed by a ring recess on an inner circumference of an opening receiving the centering bushing or on an outer circumference of the centering bushing and the stop body is formed by a stop ring and the longitudinal extension of the ring recess is greater than the longitudinal extension of the stop ring in the axial direction of the centering bushing in each case.

11. The centering device according to claim 1, wherein the elastic spring device comprises one of: at least one disc spring, a rubber spring, and an element made of an elastomer.

12. The centering device according to claim 1, wherein the centering bushing is located approximately in its central adjustment range or in an end position of its adjustment range when the top is closed.

13. The centering device according to claim 1, wherein the top is one of a retractable top and a detachable top.

14. A centering device for a top of a motor vehicle, comprising:
   a centering pin carrier from which protrudes a centering pin;
   a centering bush carrier in which is arranged a centering bushing having a centering opening, the opening radially centering the centering pin as it penetrates the centering opening;
   wherein one of the centering bushing in a guide opening of the centering bush carrier and the centering pin in a guide opening of the centering pin carrier are operatively arranged to be axially adjustable between stops and loaded by an elastic spring device against one of said stops.

15. The centering device according to claim 14, wherein the centering pin carrier is configured on one of a front area of the top and an upper cowl area above a windshield of the vehicle, and further wherein the centering bush carrier is configured in an opposite one of the front area and the upper cowl area.

16. The centering device according to claim 15, wherein the top is one of a retractable top and a detachable top.

* * * * *